J. LARSEN.
SOD CUTTER.
APPLICATION FILED APR. 22, 1911.
1,007,459.
Patented Oct. 31, 1911.
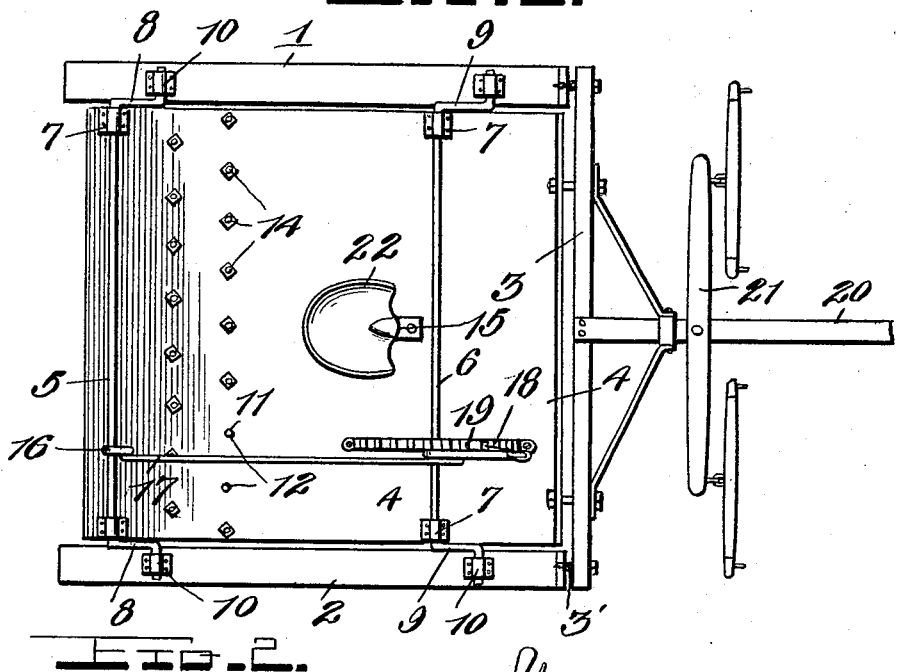
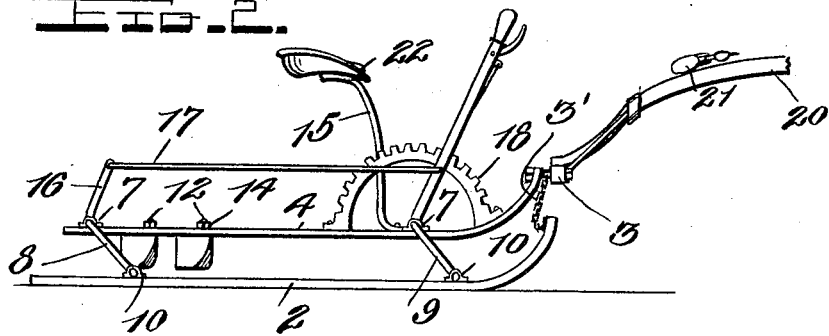
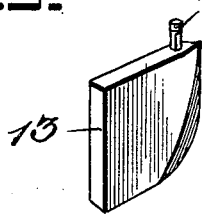
Witnesses
Chas. L. Griestauer.
L. G. Ellis.
Inventor
Julius Larsen,
By Watson E. Coleman.
Attorney

UNITED STATES PATENT OFFICE.

JULIUS LARSEN, OF DEER LODGE, MONTANA.

SOD-CUTTER.

1,007,459. Specification of Letters Patent. Patented Oct. 31, 1911.

Application filed April 22, 1911. Serial No. 622,732.

*To all whom it may concern:*

Be it known that I, JULIUS LARSEN, a citizen of the United States, residing at Deer Lodge, in the county of Powell and State of Montana, have invented certain new and useful Improvements in Sod-Cutters, of which the following is a specification, reference being had to the accompanying drawings.

My invention relates to new and useful improvements in agricultural implements and more particularly to a sod cutter, and my object is to provide a device of this character which is simple in construction and practical and effective in operation.

A further object of the invention resides in providing a running frame and a movable body portion therefor carrying the cutters, which body portion is capable of adjustment to various heights.

A further object of the invention is to provide a seat mounted on the body portion, whereby the weight of the driver will cause the cutters carried by the body portion to effectively engage the sod and cut the same as the machine is driven, and a still further object resides in providing means for the raising and lowering of said body portion.

A further object of the invention resides in providing a draw bar which is secured to the movable platform at the forward end thereof, whereby it will be a simple matter to raise and lower the platform when the machine is in operation.

A still further object of the invention resides in providing a flexible connection between the runners and said movable platform.

With these and other objects in view, my invention consists in the novel features of construction, combination and arrangement of parts as will be hereinafter referred to and more particularly pointed out in the specification and claims.

In the accompanying drawing forming a part of this application, Figure 1 is a top plan view of the device. Fig. 2 is a side elevation thereof, and, Fig. 3 is a detail perspective of one of the cutters removed.

In carrying out my invention, I shall refer to the drawing in which similar reference characters designate corresponding parts throughout the several views and in which 1 and 2 indicate runners of the usual or any preferred type used in such machines, having the forward ends thereof curved upwardly and engaged with a draw bar or the like 3 by means of the chains 3'. Mounted between the runners is a platform or main body portion 4, which body portion is secured to the draw bar at its forward end and has the forward end thereof curved upwardly, as said runners, and is provided adjacent the forward and rear ends, respectively, with the rods 5 and 6. These rods extend transversely of the machine and are rotatably mounted in bearings 7 secured to said platform 4, and both ends of said rods are bent to form cranks 8 and 9, respectively, which cranks are rotatably mounted in bearings 10, similar to the aforesaid bearings 7, which are securely mounted on said runners 1 and 2. These rods 5 and 6, designed and secured as described, form substantial crank shafts, whereby said platform or body portion may be raised above said runners, and said platform is provided adjacent its rear end with rows of openings 11, which openings are disposed in staggered relation with one another to receive the stems 12 of the cutters 13. These stems 12 of the cutters are threaded to receive nuts 14, whereby said cutters may be securely held to the platform, and the cutters are substantially rectangular in design having the forward or cutting edge thereof somewhat convexed.

The shaft 6 has fixedly secured thereto one end of a lever 15 and the shaft 5 has fixedly secured thereto one end of an arm 16, and connecting said lever 15 and arm 16 is a connecting rod 17, whereby when said lever is moved in one direction, the platform 4 may be raised above the runners and correspondingly remove the cutters from engagement with the sod. The platform is also provided with a segmental rack 18 and the lever 15 with a spring held detent 19, whereby said lever may be moved and held in various adjusted positions to correspondingly adjust the engagement of the cutters with the sod.

The draw bar 3 has mounted thereon one end of a tongue or pole 20 which carries a double-tree 21, and mounted on the platform 4 is a seat 22 for the driver of the device, and in positioning the seat upon said platform, it will be seen that the weight of the driver may be utilized for forcing the cutters, carried by the platform, into engagement with the sod. This seat is, of course, positioned adjacent the lever 15, whereby when it is desired to adjust the position of the platform with respect to the ground so as to change the cut of the sod treating implements, the same may be readily accomplished.

From the foregoing, it will be seen that I have provided a simple, practical and effectual device for cutting sod, which device is provided with a movable platform carrying the cutters. Furthermore, it will be seen that the movable platform is provided with a seat for the driver of the device, whereby the driver's weight will be utilized for forcing the cutters into engagement with the sod, and as the device is also provided with means for raising and lowering the platform which is in close proximity to the seat, the cutters may be readily engaged or disengaged with the sod, as desired.

In view of the simplicity of the construction of the device, it will be seen that the same may be sold at a comparatively small increase over those now in use. It will also be seen that by having the platform engaged with the draw bar at the forward end thereof, instead of having the runners engaged by the draw bar, as usual, the strain upon the crank shafts will be lifted therefrom, and furthermore, the runners may be moved back and forth while the machine is being driven.

What I claim is:—

1. A device of the class described, comprising a pair of runners, a platform movably mounted therebetween, cutters carried on said platform, a seat mounted on said platform, means to raise and lower said platform with respect to the runners, a draw bar secured to the forward end of said platform, and flexible connecting means between said runners and said draw bar.

2. A device of the class described, comprising a pair of runners, a platform, crank shafts rotatably mounted on said platform and having the ends thereof rotatably mounted on said runners, means on said crank shafts to raise and lower said platform with respect to the runners, cutters carried by said platform, a draw bar secured to the forward end of said platform, and flexible connecting means between said draw bar and said runners.

In testimony whereof I hereunto affix my signature in the presence of two witnesses.

JULIUS LARSEN.

Witnesses:
J. E. O'NEILL,
JOSEPH WHETWORTH.